United States Patent [19]

Hegi

[11] Patent Number: 4,733,061

[45] Date of Patent: Mar. 22, 1988

[54] CARD PROVIDED WITH A MICROPROCESSOR AND/OR AT LEAST ONE ELECTRONIC MEMORY

[75] Inventor: Paul Hegi, Bernex, Switzerland

[73] Assignee: Lupa Finances S.A., Geneva, Switzerland

[21] Appl. No.: 816,614

[22] Filed: Jan. 6, 1986

[30] Foreign Application Priority Data

Jan. 21, 1985 [CH] Switzerland ............................ 252/85

[51] Int. Cl.⁴ ........................................... G06K 19/06
[52] U.S. Cl. ...................................... 235/492; 235/488
[58] Field of Search ......................................... 235/492

[56] References Cited

U.S. PATENT DOCUMENTS 3,702,464 11/1972 Castrucci .
4,501,960 2/1985 Jouvet .................................. 235/492

FOREIGN PATENT DOCUMENTS 0029785 6/1981 European Pat. Off. .
2081950 2/1982 United Kingdom .

Primary Examiner—Harold I. Pitts
Attorney, Agent, or Firm—Young & Thompson

[57] ABSTRACT

This card comprises contacts (8) and is composed of several plastic material layers (1,2;11,12,13,14) which are compatible. The core (1,2) comprises at least one local hard block (2) presenting a void (3). Two protecting layers (13,14) of lower thickness than the core cover the two upper and lower faces. A film (6) comprising a printed circuit the outputs of which are connected to a solid state circuit (7) comprising a microprocessor and-/or at least one electronic memory is located between the core (1,2) and one of the protecting layers (13,14) at the location of the local hard block (2). The solid state circuit (7) is located at least partially in a void (3) of this hard block (2). The terminals of the printed circuit are connected through conductors (9) to contacts (8) of the card, these conductors being also located between the core (1,2) and the protecting layer (13).

8 Claims, 4 Drawing Figures

CARD PROVIDED WITH A MICROPROCESSOR AND/OR AT LEAST ONE ELECTRONIC MEMORY

The present invention relates to cards of the credit card type which are provided with a microprocessor and/or at least one electronic memory which is able to store datas of any kinds such as individual codes, credits in one or several monneys, personnal medical datas etc. and in given cases to make certain operations on said datas according a given program contained in the microprocessor in answer to signals which are delivered to it by an electronic apparatus located outside of the card with which this card can be connected by means of apparent contacts connected to the microprocessor and to the memories contained into the card.

There are such cards which however present the drawback that the microprocessor or the memories can be accessible from the outside of the card and separated from it and this may enable the decoding of the informations contained in them.

It is also known from the U.S. Pat. No. 3,702,464 a card in which the conductors of the printed circuit connecting the solid state circuit to the contacts are disposed on one of the surfaces of one of the plastic material layer. Such cards has not been able to be realized since during the hot rolling out of the plastic material layers the conductors melt and in flowing come together forming short circuits.

The present invention has for its aim to realize such an electronic card which cannot be violated.

The present invention has for its object an electronic card provided with a microprocessor and/or at least one electronic memory obviating to the precited drawbacks. This card comprising contacts which are accessible from the outside of the card, is characterized by the fact that it is made from several layers of compatible plastic material, of compositions and of characteristics which are different, forming a monolithic assembly, by the fact that the layers are at least three in number, a central layer comprising at least one local hard block presenting at least one void as well as two protecting layers of smaller thickness than the central layer covering the two upper and lower faces of this central layer; by the fact that a film comprising a printed circuit the outputs of which are connected to a solid state circuit comprising a microprocessor and/or at least one electronic memory is located between the central layer and one of the protecting layers at the location of the hard block, the solid state circuit being located at least partly in the void of this hard block; and by the fact that the outputs of the printed circuit are connected through conductors to contacts of the card, these conductors being also situated between the central layer and the said protecting layer.

The attached drawing shows schematically and by way of example, one embodiment of the electronic card according to the invention.

Figure 1:
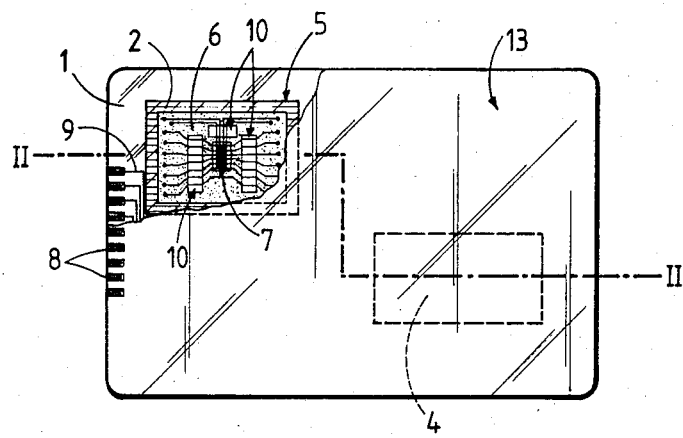
FIG. 1 is a top view of the card, a part of which being withdrawn.
Figure 2:
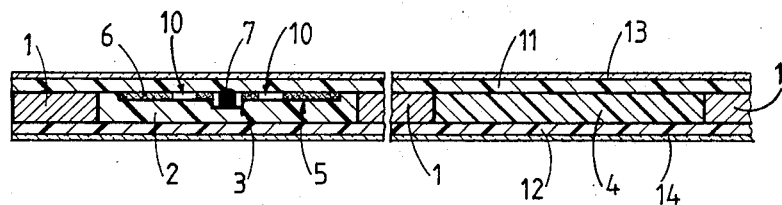
FIG. 2 is a cross section at greater scale along line II—II of FIG. 1.

The electronic card shown in the drawing comprises several layers of compatible plastic materials, of different compositions and of different characteristics which are rendered monolithic by hot rolling.

The central layer or core is composite, formed of a sheet of plastic material 1 comprising two through apertures, one housing a hard block 2, provided with a void 3 and the other housing a plate of plastic material 4 embodying an identification or marking under the form of a filigrane.

In the embodiment shown the hard block 2 comprises a void 3 which does not go throughout and which merges in a recess 5 provided in one of the faces of this hard block 2.

A portion of film 6 cut out, comprising at least one hole, carries a printed circuit the outputs of which are connected on the one side to the terminals of a solid state circuit 7 located in the hole. It is a tape automatic bonded chip now currently used in electronic.

This portion of film 6 is placed in the recess 5 of the hard block 2, the solid state circuit or chip 7 being placed in the void 3 of this hard block 2.

The output terminals of the printed circuit carried by the film 6 are connected to contacts 8, which are accessible from the outside of the card by means of conductors 9.

The portion of film 6 carrying the printed circuit comprises apertures 10 placed in such a manner that all the connections connecting the output terminals of the printed circuit to the terminals of the solid state circuit or solid state circuits cross these apertures 10.

The card shown comprises further plastic sheets which are printed 11,12 located on either side of the core 1,2 as well as of the protecting transparent layers 13,14 located on the free faces of the printed sheets 11,12.

The five layers, that is the core 1,2, the printed sheets 11,12 and the protecting layers 13,14, are rendered monolithic by hot rolling, the different plastics forming these layers being compatible.

Due to the apertures 10 provided in the portion of film 6, the printed sheet 11 is bound by the hot rolling to the hard block 2 around a part at least of all the connections of the printed circuit carried by this film 6. Thus it is impossible to separate the core 1,2 of the layer which is superimposed to it, in this example the layer 11, without destroying the printed circuit, and this renders the card not violable.

As an example one can mention that the core 1,2 can be in non transparent white plastic of a thickness of 0.40 mm, that the printed sheets, carrying the indications relating to the function of the card, a Trademark or any other useful indication for the user, can be of a thickness of 0.20 mm colored within the mass for example, and that the protecting layers are transparent and of a thickness of 0.06 mm so that the inscriptions carried by the printed sheets are visible.

The film 6 carrying the printed circuit is generally in Kapton (Trademark registered by Du Pont de Nemours) and even if this plastic material is not compatible with the plastic materials forming the core 1,2 and the printed layer 11, the card is inviolable thanks to the openings 10 provided in this film 6 permiting a tight bound between the layers 1,2 and 11 around each connexion of the printed circuit and thus their destructions when a tentative of separation of these two layers is made.

Due to the hard block 2 of the core 1,2 at level of the film 6 carrying the printed circuit as well as the solid state circuit, and due to the fact that this solid state circuit is located in the void of this hard block 2 one obtains on the one hand, that the thickness of the card is constant despite the thickness of the solid state circuit 7 which is greater than that of the film 6, and on the other hand, a good protection of the electronic part, solid state circuit and printed circuit, of the card against shocks, pressures, deformations and so on which this card may undergo.

Numerous variants of the card can be provided, the number of solid state circuits 7 is a matter of choice and depend of the functions of the card, these solid state circuits may be electronic memories or microprocessors or a combination of these elements.

In a variant, one or the other, or even the two printed layers can be suppressed, the protecting layers 13,14 being than directly bounded to the core 1,2. In these cases these protecting layers are not necessarily transparent and can themselves be coloured in their mass or may comprise inscriptions in their mass.

It is evident that one embodiment of the card without the core 4 comprising the filigrane can be provided.

As a variant, the void 3 of the hard block 2 in which the solid state circuit is located could go throughout said core and once the solide state circuit is located in said hole, the rest of it is filled with an epoxy resin or a silicon resin to embed completely the said solid state circuit.

In an other variant, the conductors connecting the contacts of the card to the terminals of the solid state circuit can be carried by the film 6, a part of this film can than go beyond the hard block 2.

Figure 3:
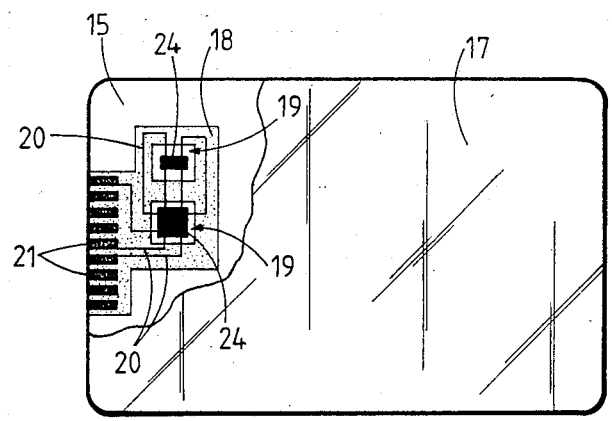
FIG. 3 shows from above a variant of this card.
Figure 4:
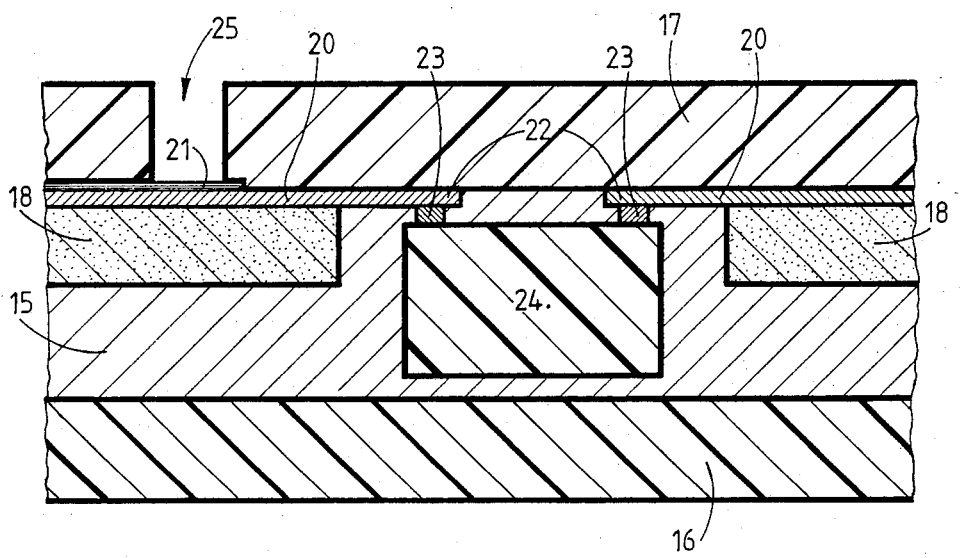
FIG. 4 is a partial cross section of the card shown at FIG. 3.

It is precisely such a variant which is shown at FIGS. 3 and 4, it presents among others the advantage to greatly facilitate the soldering of the conductors glued to the film to the terminals of the solid state circuit or circuits.

In this variant shown at FIGS. 3 and 4 the card comprises a core 15 provided on its lower and upper faces with two protection layers 16,17; this core and these layers being in plastic materials which are able to be hot rolled.

The electronic part of the card is entirely carried by a film 18 in Kapton (Trademark registered) presenting apertures 19, here two in the example shown, intended to receive solid state circuits.

The upper surface at least of this film 18 comprises conductors made out of tinn copper 20 which are glued to the film 18. These conductors have one end connected to a contact 21 the free surface of which is generally gold plated and an other end extending beyond the edge of of the film within one of the apertures 19. This end 22 is intended to be welded to a terminal 23 of a solid state circuit 24. The contacts 21 are accessible from the outside of the card through a slot 25 provided in the protecting layer 17.

When the conductors 20 are glued to the film 18, it is easy to weld each end 21 of the conductors 20 onto the corresponding terminals of the solid state circuit 24. As a matter of fact these conductors 20 being in copper there is no risk that they will melt or flow. On the other hand the absence of support for these extremities facilitate this welding and avoid the creation of short circuits.

Once the electronic part is thus terminated the film 18 provided with the conductors 20 and with the solid state circuits 24, is placed in the desired position between the core 15 and the protecting layer 17.

Finally the three layers 15,16,17 are hot rolled so that these layers are thermowelded the one to the others and that all the voids located around the conductors 20 and/or the printed circuits are fild by plastic deformation of the core in which the solid state circuits are then embedded.

The thus obtained card is extremely solid, the film, the conductors and the solid state circuits being completely embedded in the plastic material mass. Furthermore the core 15 is thermowelded to the protection layer 17 between each conductor 20 so that the card is inviolable, all tentative to separate the layers 17 and 15 causes the destruction of these connexions connecting the contacts 21 to the solid state circuits 24.

What is claimed is:

1. In an electronic card having electronic circuitry comprising at least one of a microprocessor and at least one electronic memory and having contacts which are accessible from the outside of the card; the improvement in which the card is made of several layers of compatible plastic materials of different compositions and different characteristics, forming a monolithic assembly, said layers are at least three in number, a core comprising at least one hard block having at least one void therein, and two protecting layers of lesser thickness than the core covering the upper and lower faces of said core; a film comprising a printed circuit the outputs of which are connected to a solid state circuit comprising said electronic circuitry, said film being disposed between the core and one of the protecting layers at the location of the hard block, the solid state circuit being located at least partially in said void of said hard block; the outputs of the printed circuit being connected by conductors to contacts of the card, these conductors being also disposed between the core and a said protecting layer.

2. Card according to claim 1, which comprises further at least one layer of plastic material which is compatible located between the core and one of the protecting layers, this intermediate layer being printed or colored in its mass.

3. Card according to claim 1, in which the film has apertures which are crossed by all the connections connecting the solid state circuit to the output terminals of the printed circuit so that the core and the adjacent protecting layer form a monolithic mass surrounding at least a portion of each of these connections.

4. Card according to claim 1, in which the void of the hard block passes through said block, a resin filling the rest of the space around the solid state circuit.

5. Card according to claim 1, in which at least one of the protecting layers is transparent.

6. An electronic card having electronic circuitry comprising at least one of a microprocessor and at least one electronic memory and having contacts which are accessible from the outside of the card, the card being made of at least three layers of compatible plastic materials which are of different compositions and different characteristics forming, after hot rolling, a monolithic assembly of a core and two protecting layers of lesser thickness than the core and covering two opposite faces of said core, a film on at least one of the faces of which conductors are secured, at least one end of certain of these conductors being electrically connected to contacts also secured to said film, said film comprising at least one aperture into which extends the other end of at least some of said conductors, these latter ends of said conductors being welded to the terminals of at least one solid state circuit located in the said aperture of the film; the film and the electronic circuit carried by it being positioned between the core and one of the protecting layers, the core filling all the free spaces located around the solid state circuit and the conductors in the said aperture of the film, one of the protecting layers having a slot giving access to the contacts carried by the film.

7. An electronic card according to claim 6, in which said conductors are tinned copper conductors.

8. An electronic card according to claim 6, in which said contacts are gold plated.

* * * * *